US006424883B1

(12) United States Patent
Hosokawa et al.

(10) Patent No.: US 6,424,883 B1
(45) Date of Patent: Jul. 23, 2002

(54) VIRTUAL NUMERIC CONTROL DEVICE ADAPTABLE TO ANY REAL NUMERIC CONTROL DEVICE

(75) Inventors: Masahiko Hosokawa; Minoru Nakamura, both of Yamanashi (JP)

(73) Assignee: Fanuc, LTD, Yamanashi (JP)

( * ) Notice: Subject to any disclaimer, the term of this patent is extended or adjusted under 35 U.S.C. 154(b) by 0 days.

(21) Appl. No.: 09/184,582

(22) Filed: Nov. 3, 1998

(30) Foreign Application Priority Data

Nov. 4, 1997 (JP) ............................................ 9-316623

(51) Int. Cl.$^7$ ............................................ G06F 19/00
(52) U.S. Cl. ............................ 700/181; 700/18; 700/86
(58) Field of Search ............................. 700/17, 18, 23, 700/25, 86, 87, 180, 181

(56) References Cited

U.S. PATENT DOCUMENTS

| 4,365,315 A | * | 12/1982 | Jamnik ............................ 704/8 |
| 4,739,468 A | * | 4/1988 | Fujimoto ........................ 700/86 |
| 4,797,811 A | * | 1/1989 | Kiyokawa et al. ............ 700/181 |
| 5,253,158 A | * | 10/1993 | Suzuki et al. .................. 700/23 |
| 5,283,749 A | * | 2/1994 | Tanahashi ...................... 700/159 |
| 5,604,914 A | * | 2/1997 | Kabe ................................ 710/1 |
| 5,808,432 A | * | 9/1998 | Inoue et al. ................... 318/561 |
| 5,953,233 A | * | 9/1999 | Higasayama et al. ......... 700/188 |
| 6,290,571 B1 | * | 9/2001 | Dilger et al. ................... 451/10 |
| 6,311,101 B1 | * | 10/2001 | Kastner .......................... 700/17 |
| 6,356,800 B1 | * | 3/2002 | Monz et al. ................... 700/180 |

* cited by examiner

*Primary Examiner*—Leo Picard
*Assistant Examiner*—Paul Rodriguez
(74) *Attorney, Agent, or Firm*—Staas & Halsey LLP (57) ABSTRACT

A numerical control apparatus is provided with an application including commands to be used therein and a virtual numerical control device independent of the specifications of a real numerical control device to be driven actually. Alternatively, the application including the commands to be used in the numerical control apparatus and virtual numerical control device independent of the specifications of the real numerical control device to be driven actually are executed. By doing this, differences between the commands and the respective specifications of the numerical control devices are eased by commands proper to the virtual numerical control device, so that the commands are made common. At the same time, commands independent of the hardware and software of the numerical control apparatus are formed for the apparatus.

11 Claims, 8 Drawing Sheets

VIRTUAL NUMERIC CONTROL DEVICE ADAPTABLE TO ANY REAL NUMERIC CONTROL DEVICE

BACKGROUND OF THE INVENTION

1. Field of the Invention

The present invention relates to a numerical control apparatus, and more specifically, to a numerical control apparatus capable of operation without regard to the specifications of commands.

2. Description of the Related Art

Generally, a numerical control apparatus uses various commands, such as machining commands and auxiliary commands annexed thereto, macro commands for customizing the machining commands, C-language commands for customizing display and operation, etc. Normally, these commands are prepared according to specifications proper to the numerical control apparatus as an object of commanding. In preparing these commands, if a different numerical control apparatus is used, the commanding method sometimes may vary though functions are the same or commanding method itself is not defined. In the case where some of the specifications of the commands vary depending on the numerical control apparatus as the object of commanding, therefore, the commands are prepared quite separately despite their identity.

Accordingly, the commands must be prepared in due consideration of the specifications of the numerical control apparatus as the object of commanding.

Figure 8:
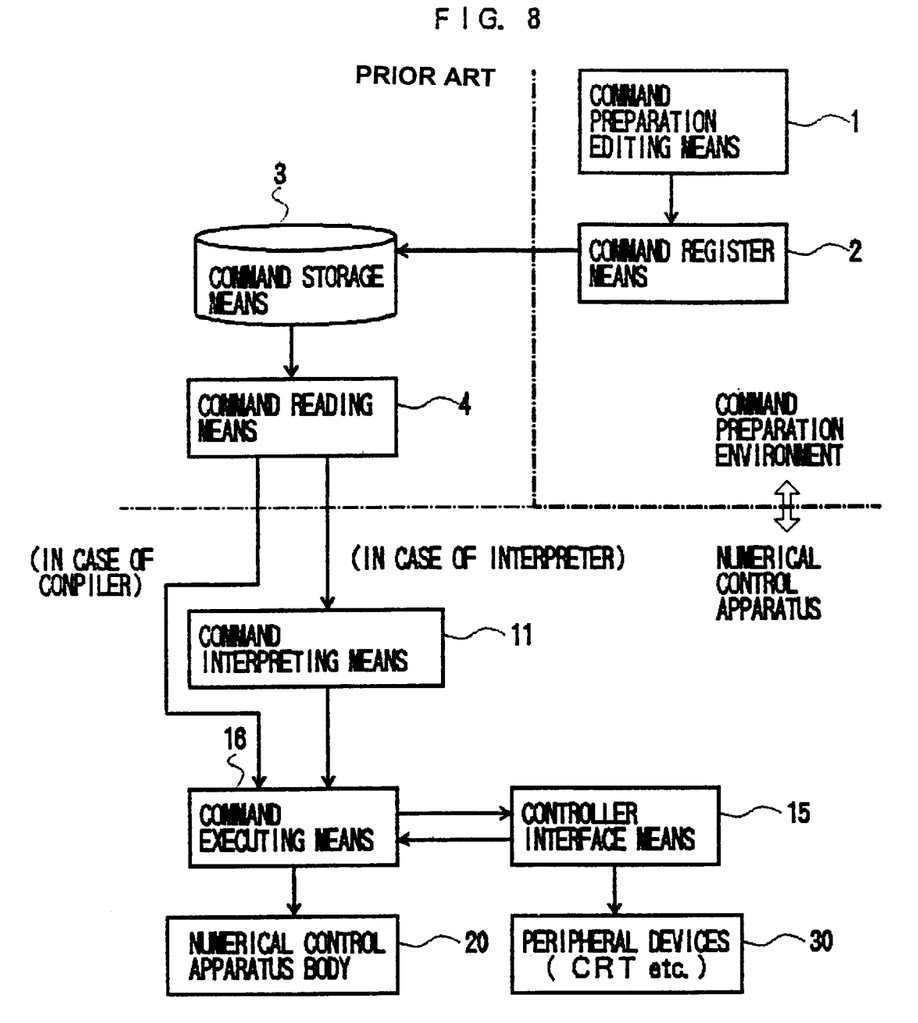
FIG. 8 is a schematic block diagram for illustrating the behavior of commands for a conventional numerical control apparatus.

FIG. 8 is a schematic block diagram for illustrating the behavior of commands for a conventional numerical control apparatus. Referring to FIG. 8, there is shown an arrangement that includes a command preparation environment intended mainly for command preparation and a numerical control apparatus that actuates a numerical control apparatus body to perform operation such as machining in response to a prepared command. The command preparation environment is provided with command preparation editing means 1 and command register means 2. The command prepared in the command preparation editing means 1 is stored in command storage means 3 by means of the command register means 2. The numerical control apparatus is provided with the command storage means 3, command reading means 4, command interpreting means 11, control device interface means 15, command executing means 16, a numerical control apparatus body 20, and a peripheral device 30.

The command stored in the command storage means 3 is delivered to the command executing means 16 through the command reading means 4. This command is executed in the numerical control apparatus body 20, whereupon processing such as machining is carried out. The command executing means 16 exchanges data with the peripheral device 30, such as a CRT or input-output device, through the control device interface means 15. When the command is executed by the command executing means 16, it is converted by the command interpreting means 11, such as a compiler or interpreter, into a signal form that is executable by the numerical control apparatus body 20.

In the conventional numerical control apparatus, as described above, the command preparation requires a great store of knowledge of specifications proper to the numerical control apparatus and takes much time and labor.

Some machine tools that employ a numerical control apparatus may use another numerical control apparatus for various reasons, including the necessity of improved functions, reduction in cost, etc. Since these numerical control apparatuses have different command specifications, quite different commands must be prepared, and this command preparation is a severe burden.

In the case where a numerical control apparatus is replaced with a new one by retrofitting or the like, making the most of a driving part of a machining apparatus, for example, commands that have been stored in the former control apparatus for years must be modified and adjusted to the specifications of the new apparatus. Thus, the replacement takes much time and labor, and besides, the commands of the broken-in specifications cannot be used.

In general, the manufacturer of a numerical control apparatus originally settles the specifications of the apparatus, so that a user of the apparatus cannot avoid a burden that is attributable to modification of the specifications.

OBJECTS AND SUMMARY OF THE INVENTION

An object of the present invention is to provide numerical control apparatuses capable of using common commands despite the differences in command specifications, thereby solving the aforementioned problems of the conventional numerical control apparatuses.

Another object of the invention is to provide a numerical control apparatus capable using commands independent of its hardware or software.

According to the present invention, commands for different numerical control apparatuses are made common by mounting each numerical control apparatus with a command executing environment as a virtual numerical control device that is independent of the apparatus. More specifically, the specifications of the virtual executing environment are settled, and a command prepared by a user is used as a command for the virtual numerical control device. By doing this, a command independent of a specific numerical control apparatus can be created. Thus, a command need not be re-created for each alternative numerical control apparatus.

The virtual numerical control device is provided with command interpreting means for interpreting a command for the virtual numerical control device, command executing means for executing the interpreted command, and interface means for the delivery of information to and from a real numerical control apparatus.

The command interpreting means of the virtual numerical control device interprets grammar and converts the command into a set of basic instructions that are easy to execute. The command executing means, which is a processor section of the virtual numerical control device, successively reads and executes commands converted into sets of basic instructions by the command interpreting means, in the same manner as a conventional microprocessor. The interface means converts an output command from the command executing means into the interface specifications of the numerical control apparatus (or adjusts the transfer of information between the virtual and real numerical control devices).

More specifically, a numerical control apparatus according to the present invention comprises a virtual numerical control device and a real numerical control device. In an aspect of the invention, the virtual numerical control device includes means for converting an input command into a set of basic instructions, executing means for executing the input command, and interface means for connection with the real numerical control device. Based on the result of execution by the executing means, the virtual numerical control device actuates the real numerical control device through the interface means.

In another aspect of the invention, the virtual numerical control device has a proper input command system and includes executing means for executing the command according to the proper input command system and interface means for connection with the real numerical control device. Based on the result of execution by the executing means, the virtual numerical control device actuates the real numerical control device through the interface means.

In still another aspect of the invention, the virtual numerical control device has a proper input command system and includes means for converting an input command into a set of basic instructions, executing means for executing the command based on the proper command system, and interface means for connection with the real numerical control device. Based on the result of execution by the executing means, the virtual numerical control device actuates the real numerical control device through the interface means.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

A numerical control apparatus according to an embodiment of the present invention will now be described with reference to the schematic block diagram of FIG. 1.

Figure 1:
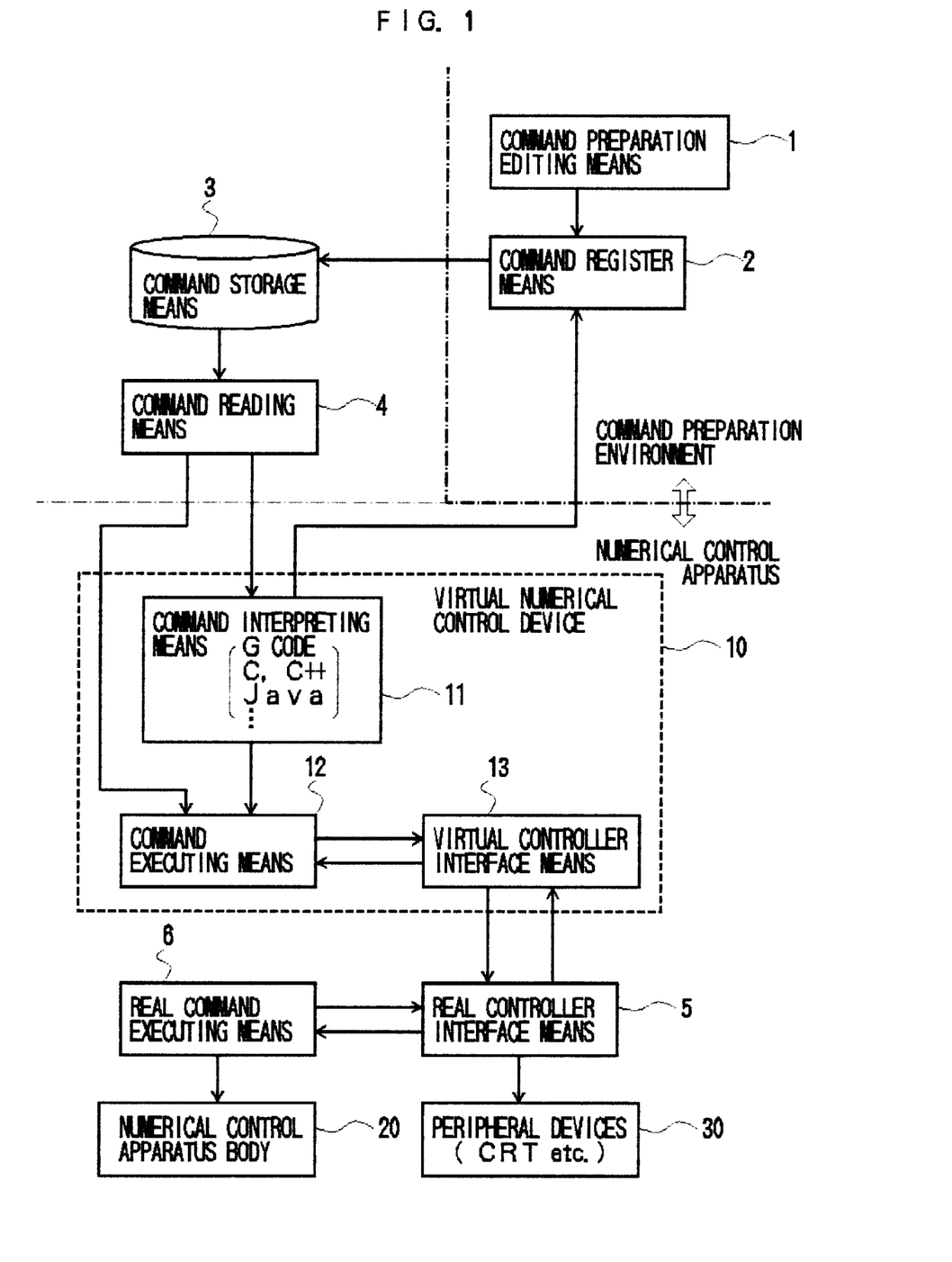
FIG. 1 is a schematic block diagram for illustrating a numerical control apparatus according to the present invention.

Referring to FIG. 1, there is shown an arrangement that includes a command preparation environment intended mainly for command preparation and a numerical control apparatus that actuates a numerical control apparatus body to perform operation such as machining in response to a prepared command. The command preparation environment is provided with command preparation editing means 1 and command register means 2. The command prepared in the command preparation editing means 1 is stored in command storage means 3 by means of the command register means 2.

The numerical control apparatus is provided with the command storage means 3, command reading means 4, a virtual numerical control device 10, real controller interface means 5, real command executing means 6, a numerical control apparatus body 20, and a peripheral device 30.

The virtual numerical control device 10, which has been developed according to the specifications of a specific numerical control apparatus, specifications of available commands, and programming languages, is provided with various functions including command interpreting means 11, command executing means 12, and virtual controller interface means 13.

The virtual numerical control device 10 can be developed and mounted according to the specifications of each numerical control apparatus, specifications of the available commands, and the programming languages. The device 10 has, as its proper input command system, a set of basic instructions corresponding to the specifications of the numerical control apparatus and a programming language for writing down the instructions.

A program that is used to cause a processor for the virtual numerical control device to execute its functions is stored in advance in a storage medium that can be read by the processor. In extending or changing the specifications of the numerical control apparatus and the commands, functions can be changed or added by means of the storage medium. Those functions of the virtual numerical control device which are developed by means of a certain numerical control apparatus can be diverted to another numerical control apparatus.

Further, the command storage means 3 and the command reading means 4 may be separated from the numerical control apparatus so that they can be arranged on the command preparation environment side. Alternatively, the command preparation editing means 1 and the command register means 2 may be provided in the numerical control apparatus.

The command stored in the command storage means 3 is delivered to the virtual numerical control device 10 through the command reading means 4. If this command is a machining command, it is converted by means of the virtual numerical control device 10 into a command that can be executed in the numerical control apparatus body 20. Then, the converted command is delivered to the numerical control apparatus body 20 to be processed therein.

Data are transferred between the real command executing means 6 and the peripheral device 30, such as a CRT or input-output device, through the real controller interface means 5.

The command interpreting means 11 grammatically interprets programming languages (e.g., G code, C language, C++ language, and JAVA language) for writing down input commands and decodes operations assigned by the input commands. The decoded commands are converted into commands (set of basic instructions) proper to the virtual numerical control device 10 and delivered to the command executing means 12. Thus, the virtual numerical control device 10 can execute operations that are independent of its specifications such as the grammars of the input commands.

The command interpreting means 11 has a conversion function for converting commands that are set on the command preparation environment side, in accordance with the correlation between the grammars and specifications of operations set on the command preparation environment side and those set on the virtual numerical control apparatus side, into commands corresponding to the virtual numerical control device side. This correlation and conversion function can be previously stored in the form of a program in the storage medium that can be read by the processor. Thus, the storage medium can be moved and transplanted to another numerical control apparatus.

The command executing means 12, which is a processor section of the virtual numerical control device 10, successively reads and executes commands processed by the command interpreting means 11, in the same manner as a conventional microprocessor.

The virtual controller interface means 13, in conjunction with the real controller interface means 5, constitutes an interface, and serves for the consistency of information between the virtual numerical control device 10 and a real numerical control device. Thus, the virtual controller interface means 13 has a function for the consistency of signals for transmitting commands from the virtual numerical control device 10 to the numerical control apparatus and of signals for transmitting data from the numerical control apparatus to the virtual numerical control device 10. This function can be previously stored in the form of a program in the storage medium that can be read by the processor. Thus, the storage medium can be moved and transplanted to another numerical control apparatus.

Accordingly, a command applied to the virtual controller interface means 13 from the command executing means 12 is adjusted to a signal form corresponding to the specifications of the real command executing means 6 of the numerical control apparatus in the virtual controller interface means 13, and is delivered to the real command executing means 6 through the real controller interface means 5. Data delivered to the virtual controller interface means 13 from the real command executing means 6 of the numerical control apparatus through the real controller interface means 5 is adjusted to a signal form corresponding to the specifications of the virtual numerical control device 10 in the virtual controller interface means 13, and is delivered to the command executing means 12. In order to accomplish these functions, the virtual controller interface means 13 is provided with data for the correlation between the specifications of the virtual and real numerical control devices, and converts the commands and data in accordance with the correlation data.

The real numerical control device includes the real controller interface means 5, real command executing means 6, numerical control apparatus body 20, and peripheral devices 30.

Figure 2:
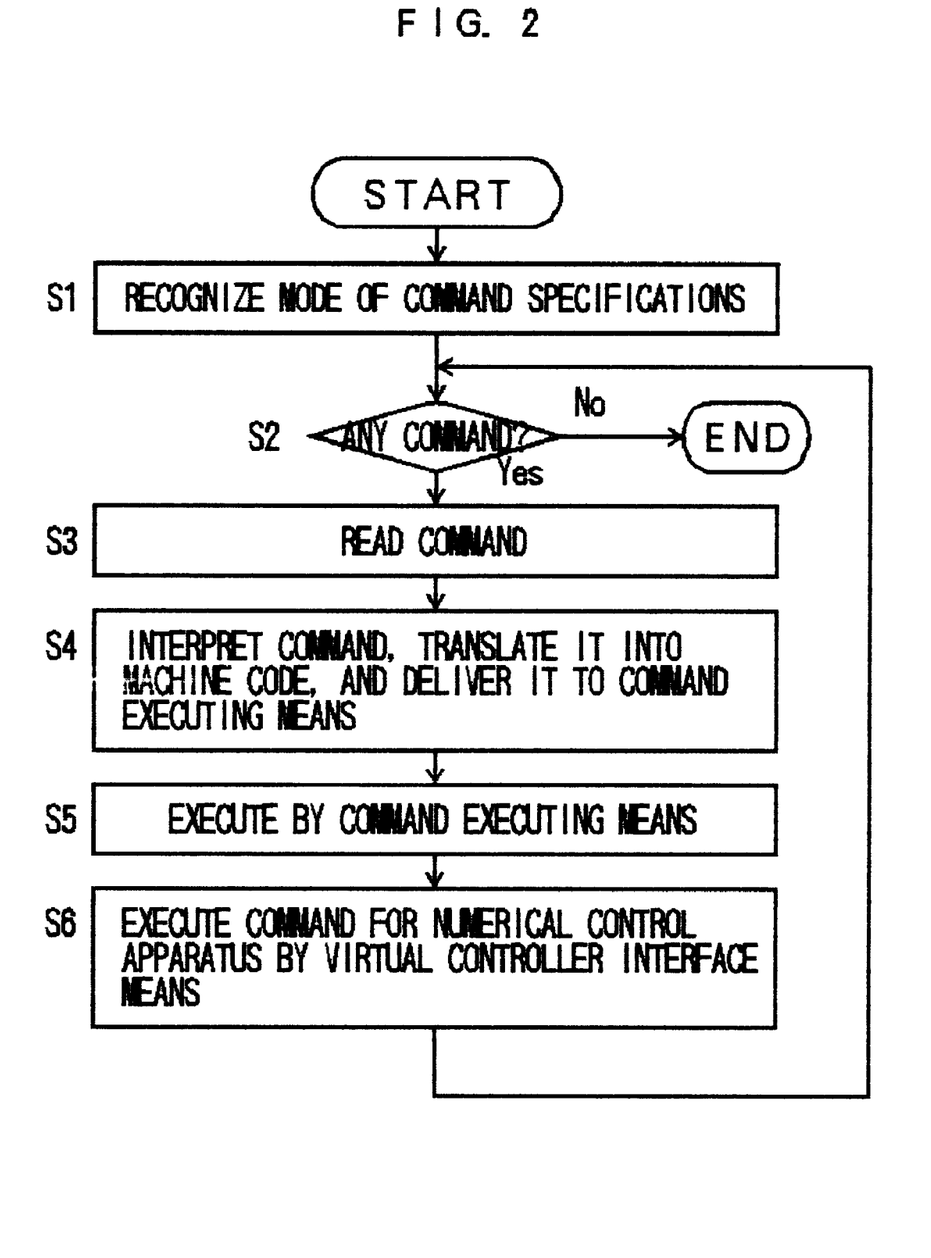
FIG. 2 is a flowchart for illustrating the operation of a virtual numerical control device in the numerical control apparatus of the invention.

Referring now to the flowchart of FIG. 2, the operation of the virtual numerical control device in the numerical control apparatus with the construction shown in FIG. 1 will be described.

The virtual numerical control device 10 previously recognizes the programming language and specifications used for a command from the command reading means 4, prepares conversion functions and the like for the interpretation process to be executed in the command interpreting means 11 (Step S1). In executing the command (Step S2), the command read in the command reading means 4 is delivered to the command interpreting means 11 (Step S3). The command interpreting means 11 executes a decoding process such as grammatical interpretation for the command, converts the command into machine codes (mnemonic codes) proper to the virtual numerical control device, and delivers the converted machine codes successively to the command executing means 12. Alternatively, the machine codes converted in the command interpreting means 11 may be previously stored in the command storage means 3 through the command register means 2 and delivered to the command executing means 12. Since the decoding process and conversion process are already finished, in this case, time for those processes can be saved in the process for delivering the machine code command to the command executing means 12, so that the speed of processing can be increased (Step S4).

The command executing means 12 successively executes the inputted machine codes and delivers the execution to the virtual controller interface means 13 (Step S5). The virtual controller interface means 13 converts the delivered execution into available specifications for the real numerical control device, and delivers the specifications to the real controller interface means 5, whereupon the real numerical control device is activated (Step S6).

According to the arrangement of the numerical control apparatus of the present invention and a control method therefor, commands can be executed without being prepared to accommodate the differences, if any, between the respective specifications of the command execution environment and the real numerical control device.

Figure 3:
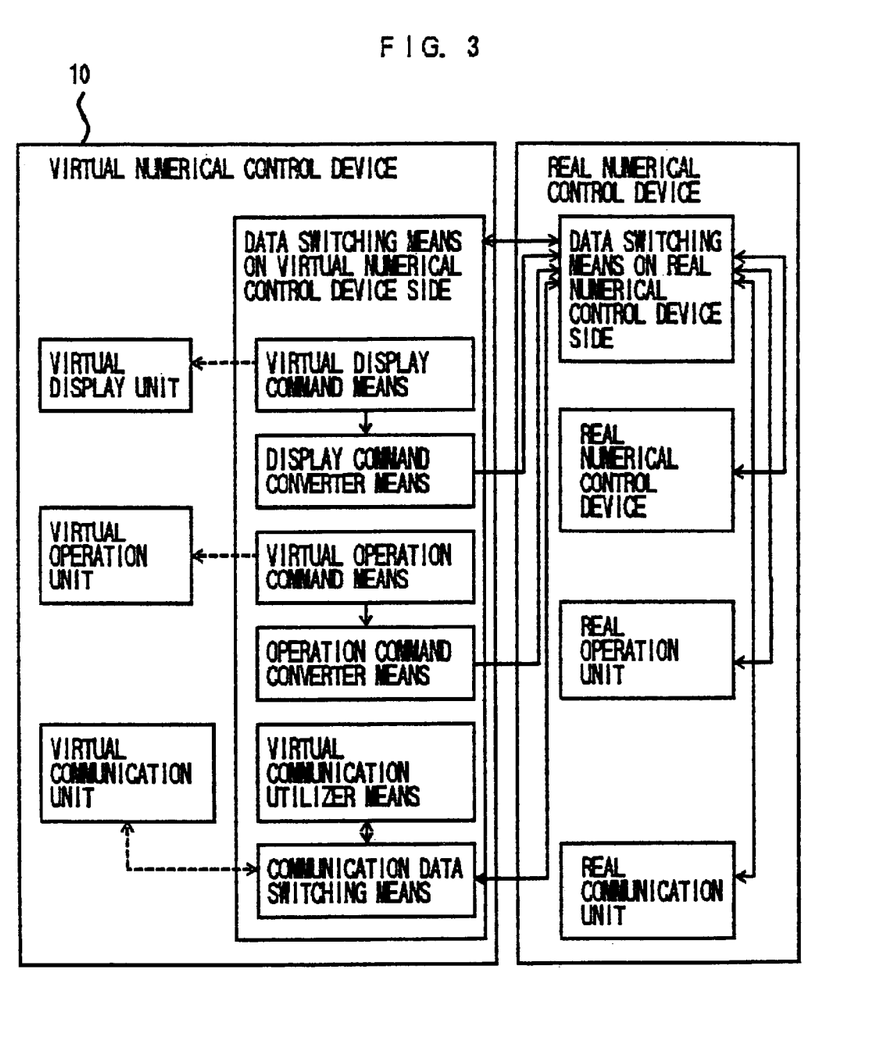
FIG. 3 is a diagram for illustrating an arrangement for settling differences between the respective specifications of the virtual numerical control device and a real numerical control device according to the invention.

FIG. 3 is a diagram for illustrating an arrangement for settling the differences between the respective specifications of the virtual numerical control device and the real numerical control device. This arrangement includes the virtual controller interface means 13 and the real controller interface means 5 shown in FIG. 1.

Referring to FIG. 3, the virtual numerical control device is provided with virtual controller-side data switching means, whereby data on the virtual numerical control device are converted into specifications corresponding to the real numerical control device. On the other hand, the real numerical control device is provided with real controller-side data switching means, whereby data on the real numerical control device are converted into specifications corresponding to the virtual numerical control device. Thus, the virtual and real numerical control devices can exchange data with each other despite differences, if any, between the data specifications.

For a display function, for example, the virtual numerical control device is provided with virtual display command means for delivering display commands to a virtual display unit in the virtual numerical control device and display command converter means for converting the display commands for the virtual display unit into commands for a real display unit, whereby the real display unit is enabled. For an operation function, moreover, the virtual numerical control device is provided with virtual operation command means for delivering operation commands to a virtual operation unit in the virtual numerical control device and operation command converter means for converting the operation commands for the virtual operation unit into commands for a real operation unit, whereby the real operation unit is enabled. For a communication function, furthermore, the virtual numerical control device is provided with communication data switching means for data exchange with a virtual communication utilizer means for utilizing a virtual communication unit in the virtual numerical control device, whereby a real communication unit is enabled.

Figure 4:
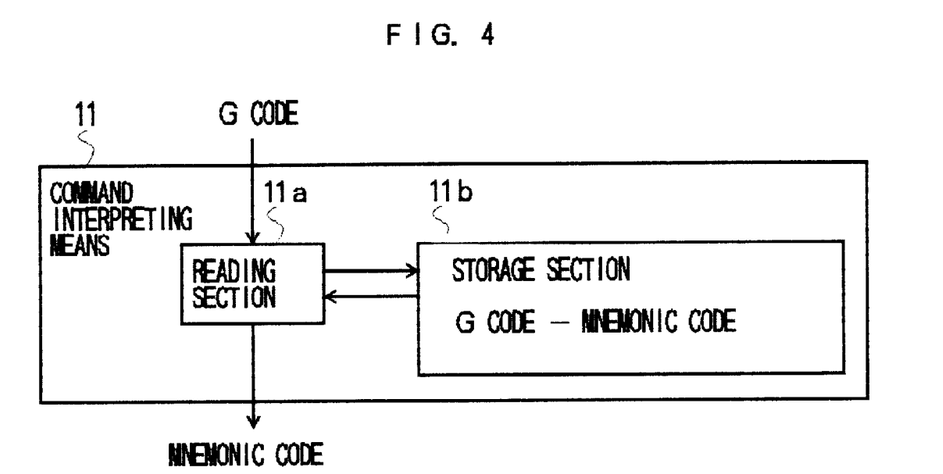
FIG. 4 is a diagram for illustrating a configuration based on a corresponding code table of command interpreting means according to the invention.

The command interpreting means 11 carries out a grammatical interpretation process by software, and further, in the case where the code commands are based on G codes or the like, the command interpreting means 11 may be constructed so that it uses a corresponding code table. FIG. 4 shows a configuration where the corresponding code table is used.

Referring to FIG. 4, the command interpreting means 11 may be designed so that it has a storage section 11b for storing corresponding data for the G codes and the machine codes (mnemonic codes) proper to the virtual numerical control device, and that the data are read by means of its reading section 11a.

The following is a description of examples of operation for the case where the commands are written down in a general-purpose programming language. In the description to follow, the C++ and JAVA languages are supposed to be used as specific examples of the general-purpose programming language.

In the following examples of applications, the number of control axes, control axis names, and absolute position information are obtained from the numerical control apparatus and displayed on a screen.

In the following instance of a program, C++ language is used:

```
001:    /* ------------------------------------------
002:    *display example of absolute position of CNC by
        virtual numerical control device
003:    *
004:    *
005:    *------------------------------------------*/
006:    #include        "Cncobject.h"
007:    void main (void)
008:                    /*generation of instance of CNC object*/
009:                    CncObject cnc ;
010:
011:                    /*acquisition of absolute position*/
012:                    cnc.GetAbsPos ((short) −1);
013:
014:                    /*repetition of processes number of
                        times equal to the number of control
                        axis and display of axis name and
                        absolute position of axis*/
015:                    for (int i=0;i<cnc.AxisNum;i++) {
016:                    cnc.out.println (cnc.AxisName[i]+" "+cnc.
                        AbsPos [i]):0
017:                    }
018:    }
```

In the above program instance, rows 001 to 005 are comment rows that have no influence on the commands. Row 006 directs a definition file "CncObject" to be read. Row 007 represents the beginning of a function, and "main" is a function for starting the program.

Row 009 defines the substance of a class "CncObject". "CncObject" is an object representing a virtual version of the numerical control apparatus, and has a method for invoking the virtual controller interface means shown in FIG. 1. A data structure delivered to and from the real controller interface means of the real numerical control device is managed by "CncObject", whereupon any numerical control apparatuses can be considered as control apparatuses of the same type in view of commands.

In row 012, "GetAbsPos ( )", which is an absolute position obtaining method for "CncObject", is executed. By executing this method, data for the absolute position in "CncObject" is updated.

Row 015 is a "for" statement for repeated execution in which the number of times equal to the number of control axes are repeated. The variable "cnc.AxisNum" is a control-axis-number variable to be set when the substance of "CncObject" of row 009 is defined. Static data, such as the control axis number and axis name, are automatically set when the substance is defined.

Row 016 is a function for performing display. A method name "cnc.out.println ( )" represents display means. It is converted into a command for the real display unit through an interface for connection with the numerical control apparatus. A variable "cnc.AxisName [ ]" is an array variable for the axis name of the numerical control apparatus, which is set when the substance in row 009 is defined, as in the case of row 015. A variable "cnc.AbsPos [ ]" is an array variable for the absolute position of the numerical control apparatus. The content of this variable is updated by executing the method "GetAbsPos ( )", as in the case of row 012.

Figure 5:
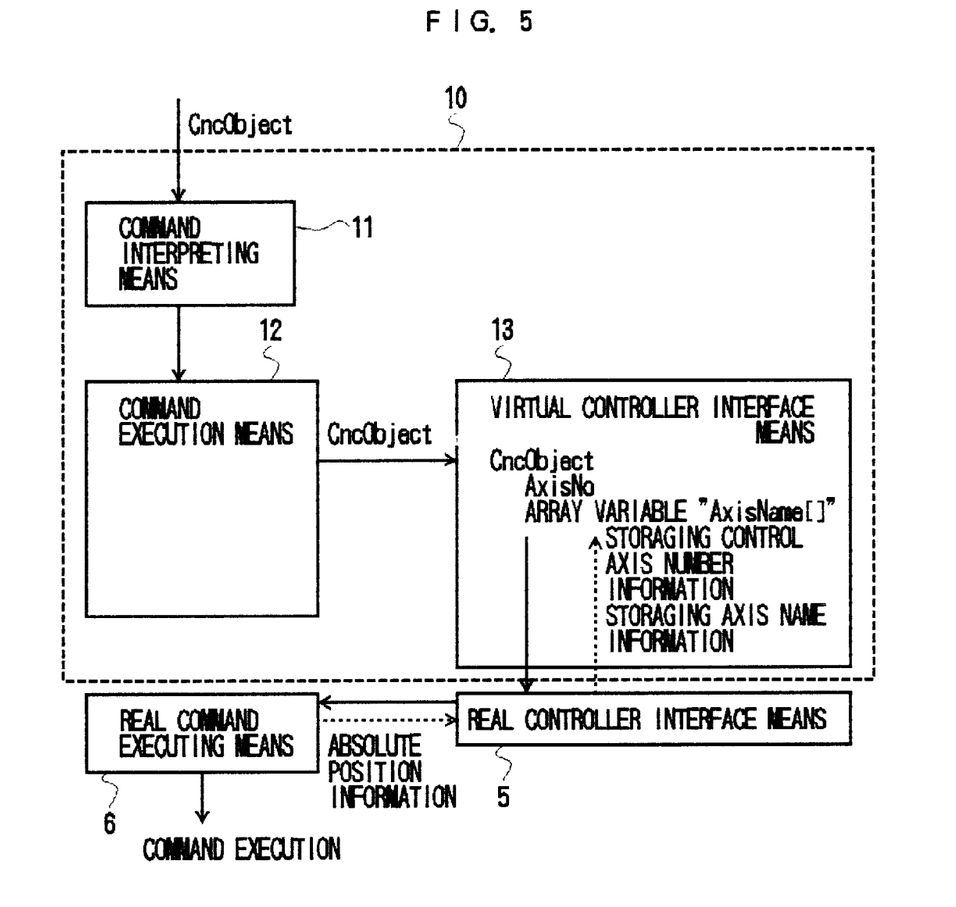
FIG. 5 is a diagram for illustrating the behavior of commands in a program instance.
Figure 6:
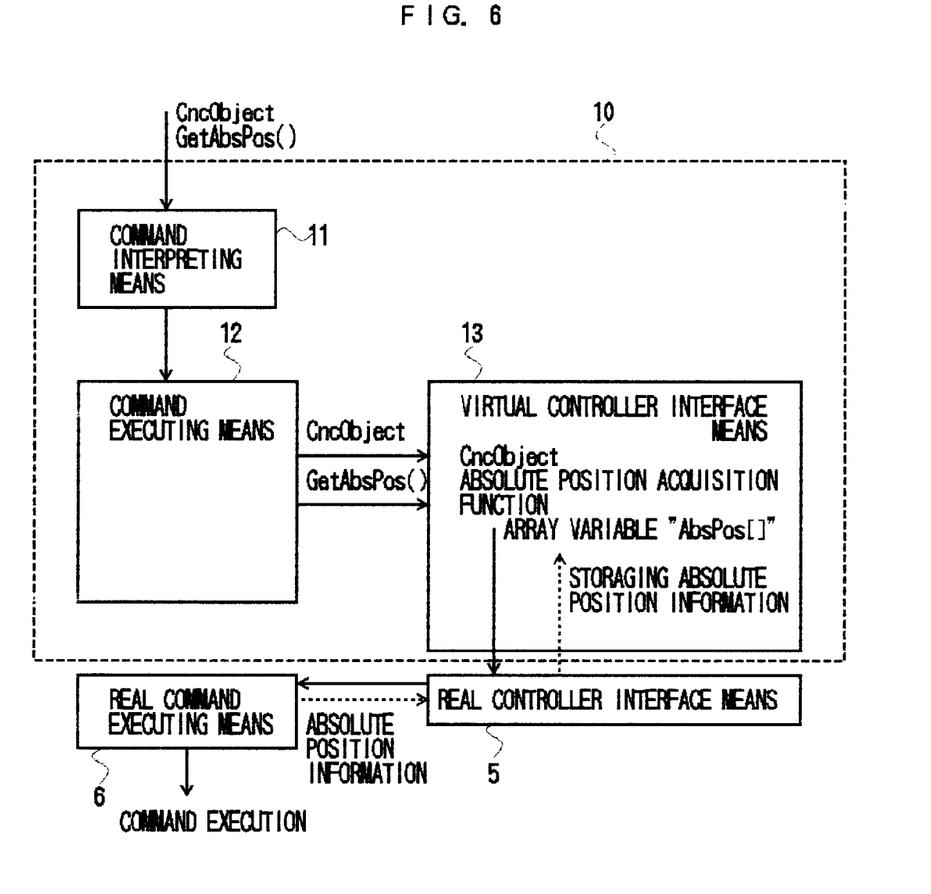
FIG. 6 is a diagram for illustrating the behavior of commands in another program instance.

Referring now to FIGS. 1, 5 and 6, the operation of the commands in the aforementioned program instance will be described. The commands are loaded into the command storage means 3, such as a nonvolatile memory or hard disc, through the command register means 2. The command interpreting means 11 reads the commands from the command storage means 3 through the command reading means 4. Since each command that is read by the command interpreting means 11 has a conventional text form, it is interpreted according to a prescribed grammar. The command is translated into an instruction to the command executing means 12 by the interpreting means 11. This instruction, like one to a conventional microprocessor, is a machine code (mnemonic code). The command executing means 12 executes machine codes in succession. If there are machine codes for input and output commands, a necessary argument is delivered to the connected virtual controller interface means 13 so that processing the machine codes is entrusted to the virtual controller interface means 13.

In this process, the machine codes can be processed by either of software and hardware, and mounting in the form of software or hardware can be selected depending on the performance, cost, etc. of the numerical control apparatus.

The virtual controller software interface means 13 can be changed for all data that the numerical control apparatus can input and output. The following is a description of a function for acquiring the aforesaid data including the control axis number, control axis name, and absolute position.

The virtual controller interface means 13 is instructed as "CncObject". TABLE 1 below shows the specifications of "CncObject".

TABLE 1

| | |
|---|---|
| Outline | Class for information interchange with numerical control apparatus |
| Method | Getabspos (axis number)<br>The absolute position of the numerical control apparatus is obtained. The absolute position of a specified axis is loaded into an array variable "Abspos [ ]" with the axis number used as an argument. If −1 is designated as the number, the respective absolute positions of all axes are obtained. |
| Variable | AbsPos [ ]<br>Array variable loaded with the absolute Position of the numerical control apparatus.<br>AxisName [ ]<br>Array variable loaded with the axis name of the numerical control apparatus.<br>AxisNo<br>Array variable loaded with the control axis number of the numerical control apparatus. |

When the substance of the class "CncObject" is defined in row 009 of the program, the virtual controller interface means 13 automatically obtains control axis number data and axis name data in the numerical control apparatus from the real controller interface means 5, and loads them into variables "AxisNo" and "AxisName [ ]", respectively, as shown in FIG. 5. Besides, the virtual controller interface means 13 acquires data such as the mounting state of hardware and the like that never change dynamically.

In the case where the method for "CncObject" is designated, the virtual controller interface means 13 executes a function corresponding to the designated method, as shown in FIG. 6. If the method "GetAbsPos ( )" is ordered in row 012 of the program, the virtual controller interface means 13 executes an absolute position acquisition function corresponding to the designated method "GetAbsPos ( )". At the same time, the virtual controller interface means 13 converts the absolute position acquisition function into a command corresponding to the real command executing means 6, and then gives the command to the real command executing means 6 through the real controller interface means 5. The real command executing 6 executes the command and gets into communication with the virtual controller interface means 5, thereby obtaining absolute position data. The obtained absolute position data is returned to the virtual controller interface means 13 in the reverse order and loaded into the array variable "AbsPos [ ]".

The real controller interface means 5 is provided with command specifications proper to the numerical control apparatus. The virtual controller interface means 13 absorbs or settles the differences between the specifications for the numerical control apparatus.

According to the virtual numerical control device of the present invention, as described above, although specifications of the hardware and software of the numerical control apparatus differ, the command executing side can execute according to common commands independent of these specifications, when the apparatus is operated.

The following is a description of an advantage of the virtual numerical control device in view of operation allotment between the numerical control apparatus side and a user side. A partial charge on the apparatus side includes loads associated with the manufacture and setup of the numerical control apparatus, while that on the user side includes a load for command preparation.

The user prepares a section represented by a class "Main" in the aforesaid program instance. The user forms the section for the class "Main" in response to the operation that the numerical control apparatus is expected to execute. The section for the class "Main" can be described in a common form without regard to the specifications of the hardware and software of the numerical control apparatus.

On the other hand, the numerical control apparatus mounts a part of the virtual controller interface means with functions and data to be used in programs prepared by the user. In the aforesaid program instance, the numerical control apparatus mounts the virtual controller interface means with a configuration that satisfies the specifications of the class "CncObject".

Thus, even though the specifications of the hardware and software of the numerical control apparatus differ, the application can be constructed making the most of the functions such as the method defined by the class "CncObject" prepared by the user. The program for this application can be executed independently of the numerical control apparatus and without requiring a recompiling process or the like.

The following program instance uses a JAVA-language for the program similar to the aforementioned program which uses C++ language:

```
001:    /*-------------------------------------------
002:    *display example of absolute position of CNC in
        "JAVA"
003:    *
004:    *
005:    *-------------------------------------------*/
006:    class Main {
007:        public static void main (String[ ]args)
008:            try }
009:                /*generation of instance of CNC object
010:                CncObject cnc=new CncObject ( );
011:
012:                    /*acquisition of absolute position*/
013:                    ret=cnc.GetAbsPos ((short) − 1);
014:
015:                    /*repetition of processes number of
                        times equal to the number of control
                        axis and display of axis name and
                        absolute position of axis*/
016:                    for (int i=0:i<cnc.AxisNum:i++) {
017:                        System.out.println(cnc.AxisName[i]+" "+
                            cnc.Abs)Pos [i]);
018:                    }
019:                }
020:                /*error handler*/
021:                catch (Exception e) {
022:                    System.out.pritln("ln Java:¥n"+e);
                        /*display of error message*/
023:                }
024:        }
025:    }
```

In the above program instance, rows 001 to 005 are comment rows that have no influence on the commands. Row 006 represents the beginning of method of a class declaration. In this case, the class name is "Main". Row 007 represents the beginning of definition of method of a class. In this case, the method name is "main".

Row 008 is a section described for settling the range of error processing. If an error is caused within the range from row 008 to row 009, the control proceeds to an error handler process of rows 0021 to 0023.

Row 010 defines the substance of the class "CncObject". "CncObject" is an object representing a virtual version of the numerical control apparatus, which serves as an interface between "JAVA" and the numerical control apparatus. A data structure subject to communication with communication means of the real numerical control device is managed by "CncObject", whereupon any numerical control apparatuses can be handled as control apparatuses of the same type, viewed from "JAVA".

In row 013, "GetAbsPos ( )", which is an absolute position obtaining method for "CncObject", is executed by executing this method. Data for the absolute position in "CncObject" is updated.

Row 016 is a "for" statement for repeated execution in which the number of times equal to the number of control axis are repeated. The variable "cnc.AxisNum" is a control axis number variable to be set when the substance of "CncObject" of row 010 is defined. Static data, such as the control axis number and axis name, are automatically set when the substance is defined.

Row 017 is a function for performing display. A method name "System.out.println ( )" represents standard display means defined in "JAVA". Since "JAVA" is premised on a virtual display unit, it is converted into a command for the real display unit through the interface for connection with the numerical control apparatus. The variable "cnc.Axis-Name [ ]" is an axis name array variable for the numerical control apparatus, which is set when the substance in row 010 is defined, as in the case of row 016. The variable "cnc.AbsPos [ ]" is an absolute position array variable for the numerical control apparatus. The content of this variable is updated by executing the method "cnc.GetAbsPos ( )", as in the case of row 013.

Rows 021 to 023 represent the error handler process. Means for displaying the contents of errors is described in row 022.

The following is a description of the class "CncObject". As shown in TABLE 2, the class "CncObject" is provided with methods and variables. While only the methods and variables of the class "CncObject" will be described below, they can be replaced with respect to all data that the numerical control apparatus can input and output.

TABLE 2 below shows the specifications of the class "CncObject".

TABLE 2

| Outline | Class for information interchange with numerical control apparatus |
|---|---|
| Method | Getcncinfo ( )<br>The control axis number and axis name of the numerical control apparatus are obtained, and are loaded into the variable "AxisNo" and array variable "AxisName [ ]", respectively.<br>Getabspos (axis number)<br>The absolute position of the numerical Control apparatus is obtained. The absolute position of a specified axis is loaded into the array variable "Abspos [ ]" with the axis number used as an argument. If −1 is designated as the number, the respective absolute positions of all axes are obtained. |
| Variable | AbsPos [ ]<br>Array variable loaded with the absolute position of the numerical control apparatus.<br>AxisName [ ]<br>Array variable loaded with the axis name of the numerical control apparatus.<br>AxisNo<br>Array variable loaded with the control axis number of the numerical control apparatus. |

These specifications are independent of the numerical control apparatus.

The following program instance is an example of the class "CncObject".

```
001:    /*------------------------------------------
002:    *class CncObject
003:    *
004:    *
005:    *------------------------------------------*/
006:    class CncObject {
007:        public native short GetCncInfo ( );
008:        public native short GetAbsPos (short axis);
009:        public final static int MAX_AXIS=24;
010:        public long AbsPos [ ] = new long [MAX_AXIS];
011:        public str AxisName [ ] = new str [MAX_AXIS];
012:        public long AxisNo;
013:
014:        public static void CncObject ( ) {
015:            GetCncInfo ( );
016:        }
017:
018:        static {
019:            System.loadLibrary ("MyImpOfCncObject");
020:        }
021:    }
```

In the above program instance, rows 001 to 005 are comment rows. Row 006 represents the beginning of declaration of "CncObject". Row 007 is a definition of a method, the substance of which is made to become an environment where a JAVA executing environment is mounted, or a function of the numerical control apparatus, not "JAVA" itself, by a qualifier "native". These constitute an interface between the JAVA executing environment and the numerical control apparatus. This interface mediates between the virtual numerical control device in "JAVA" and real numerical control device. In this case, "GetCncInfo ( )" obtains control axis number data and axis name data in the numerical control apparatus, and loads them into the variables "AxisNo" and "AxisName [ ]", respectively.

Row 008, like row 007, is a function of the numerical control apparatus. "GetAbsPos ( )" obtains absolute position data in the numerical control apparatus, and loads it into the variable "AbsPos [ ]".

Row 009 represents a constant indicative of the maximum control axis number that can be handled in this class. Row 010 represents an array variable indicative of an absolute position, which is updated by the method "GetAbsPos ( )" defined in row 008.

Rows 011 and 012 represent an array variable indicative of the axis name and a variable indicative of the control axis number, respectively. These variables are set by the method "GetCncInfo ( )" executed by the method "CncObject ( )" that is executed when the substance is defined.

Rows 014 to 016 represent a constructor that is executed when the substance of the class "CncObject" is defined. The method "CncObject ( )" is executed, and the axis name and control axis number are loaded in the manner described in connection with row 007.

Rows 018 to 020 represent a method for declaring the execution of a library for executing a function of the numerical control apparatus from the JAVA executing environment. The library based on this declaration enables the function of the numerical control apparatus to be executed according to "JAVA".

Figure 7:
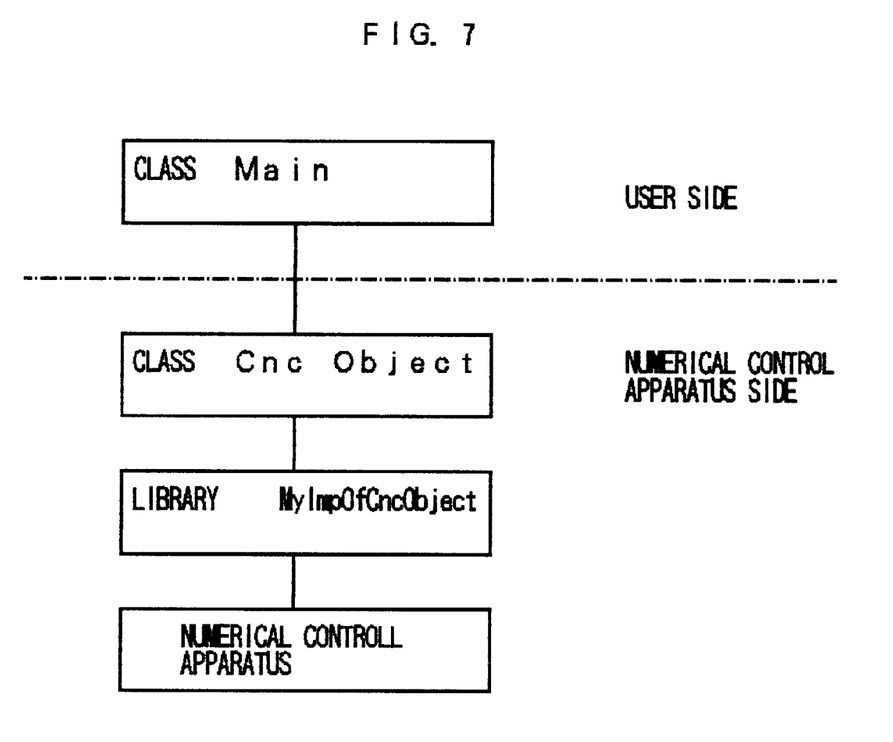
FIG. 7 is a diagram for illustrating operation allotment between the numerical control apparatus side and a user's side.

FIG. 7 is a diagram for illustrating an operation allotment between the numerical control apparatus side and the user side. Referring to FIG. 7, the user is expected to prepare only the class "Main", and the section for the class "Main" is executable without regard to the type of the numerical control apparatus. The numerical control apparatus is mounted with the virtual controller interface means so that the specifications of the class "CncObject", which is an interface for connection with the user side, are satisfied. If the type of the numerical control apparatus differ, it is only necessary that the same interface be used in the class "CncObject" or a library "MyImpOfCncObject".

Thus, the application can be constructed making the most of the method defined by the class "CncObject" even with use of a different numerical control apparatus. The program for this application can be executed independently of the numerical control apparatus and without requiring a recompiling process or the like.

What is claimed is:

1. A numerical control apparatus comprising a virtual numerical control device and a real numerical control device, the virtual numerical control device including means for converting input commands prepared in any language forms and with any performance specifications into a set of basic instructions from a predefined instruction set, executing means for executing the converted set of basic instructions in a form and with a specification used by said real numerical control device, and interface means for connection with the real numerical control device, and the virtual numerical control device being adapted to actuate the real numerical control device through the interface means in accordance with the result of execution by the executing means.

2. A numerical control apparatus according to claim 1, wherein said virtual numerical control device includes command interpreting means for decoding a command prepared in any language form and with any performance specifications and converting the command into a proper form corresponding to the real numerical control device.

3. A numerical control apparatus as recited in claim 1, wherein said virtual numerical control device decodes commands prepared in a plurality of language forms and performance specifications into the basic instructions and converts the commands into a proper form for said real numerical control device by execution of the basic instructions.

4. A numerical control apparatus comprising a virtual numerical control device and a real numerical control device, the virtual numerical control device having a predefined input command system and including executing means for executing the input commands prepared in any language forms and with any performance specifications according to the predefined input command system and interface means for connecting with the real numerical control device and communicating the input commands of any language and with any performance specification in a form and with a specification used by said real numerical control device, and the virtual numerical control device being adapted to actuate the real numerical control device through the interface means in accordance with the result of execution by the executing means.

5. A numerical control apparatus comprising a virtual numerical control device and a real numerical control device, the virtual numerical control device having a proper input command system and including means for converting input commands prepared in any language forms and with any performance specifications into a set of basic instructions from a predefined instruction set based on the proper input command system, executing means for executing the input commands based on the proper input command system in accordance with the set of instructions in a form and with a specification used by said real numerical control device, and interface means for connection with the real numerical control device, and the virtual numerical control device being adapted to actuate the real numerical control device through the interface means in accordance with the result of execution by the executing means.

6. A numerical control apparatus comprising:

a real numerical control device;

a virtual numerical control device including means for converting input commands prepared in any language forms and with any performance into a set of basic instructions from a predefined instruction set in a form and with a specification used by said real numerical control device, and at least one of means (a) to (c):

(a) virtual display command means for delivering a display command to a virtual display unit which includes a display command interpreting function, a display command executing function, and interface means for connection with a real display unit, and display command converter means for converting the display command into a display command for the real display unit;

(b) virtual operation command means for delivering an operation command to a virtual operation unit which includes an operation command interpreting function, an operation command executing function, and interface means for connection with a real operation unit, and operation command converter means for obtaining an operation command from the real operation unit and converting the operation command into the operation command for the virtual operation unit; and (c) means for using a virtual communication unit which includes a communication command interpreting function, a communication command executing function, and interface means for connection with a real communication unit, and communication data switching means for data exchange between the virtual communication unit and the real communication unit; and data switching means included in the virtual and real numerical control devices for data exchange between the virtual numerical control device and the real numerical control device.

7. A numerical control apparatus comprising:

a virtual numerical control device to execute commands prepared in any language forms and with any performance specifications based on a predefined instruction set according to a proper input command system; and a real numerical control device connected via an interface with said virtual numerical control device and actuated by results of execution of the commands by said virtual numerical control device in a form and with a specification used by said real numerical control device.

8. A numerical control apparatus comprising:

a real numerical control device including a real display unit, a real operation unit, a real communication unit, and a data switching unit; and a virtual numerical control device including means for converting input commands prepared in any language forms and with any performance into a set of basic instructions from a predefined instruction set in a form and with a specification used by said real numerical control device, a data switching unit communicating with the data switching unit in said real numerical control apparatus, and at least one of:

a virtual display unit, interfaced with the real display unit, via the data switching units in said real and virtual numerical devices, to interpret, execute and thus, convert an input display command into a proper display command for the real display unit;

a virtual operation unit, interfaced with the real operation unit, via the data switching units in said real and virtual numerical devices, to convert an input operation command received from the real operation unit, into a virtual operation command, to execute the virtual operation command and to supply results thereof to the real operation unit; and a virtual communication unit, interfaced with the real communication unit via the data switching units in said real and virtual numerical devices, to interpret and execute a communication command, and to supply results thereof to the real communication unit.

9. A numerical control apparatus comprising:

a real numerical control device;

a virtual numerical control device including a unit to convert input commands prepared in any language forms and with any performance into a set of basic instructions from a predefined instruction set;

an execution unit to execute the converted set of basic instructions in a form and with a specification used by said real numerical control device to obtain a result; and an interface unit to connect the virtual numerical control device with the real numerical control device, the virtual numerical control device actuating the real numerical control device via the interface unit in accordance with the result generated by the execution unit.

10. A numerical control apparatus comprising:

a real numerical control device;

a virtual numerical control device having a predefined input command system; and including an execution unit to execute the input commands prepared in any language forms and with any performance specifications according to the predefined input command system and obtain a result; and an interface unit to connect the virtual numerical control device with the real numerical control device, the virtual numerical control device actuating the real numerical control device via the interface unit in accordance with the result generated in a form and with a specification used by said real numerical control device.

11. A numerical control apparatus comprising:

a real numerical control device;

a virtual numerical control device having a proper input command system and including a unit for converting input commands prepared in any language forms and with any performance specifications into a set of basic instructions from a predefined instruction set based on the proper input command system;

an execution unit to execute the input commands based on the proper input command system in accordance with the set of instructions in a form and with a specification used by said real numerical control device, to obtain a result; and an interface unit to connect the virtual numerical control device with the real numerical control device, the virtual numerical control device actuating the real numerical control device via the interface unit in accordance with the result generated in a form and with a specification used by said real numerical control device.

* * * * *